March 26, 1968 J. L. E. BALDWIN ET AL 3,375,326

VIDEO D.C. INSERTION CIRCUIT

Filed Aug. 20, 1964 2 Sheets-Sheet 1

INVENTORS
JOHN LEWIS EDWIN BALDWIN
DEREK JOHN PARKYN
BY Kane and Nydick
ATTORNEYS INVENTORS
JOHN LEWIS EDWIN BALDWIN
DEREK JOHN PARKYN
BY Hane and Nydick
ATTORNEYS United States Patent Office 3,375,326
Patented Mar. 26, 1968

3,375,326
VIDEO D.C. INSERTION CIRCUIT

John Lewis Edwin Baldwin, Croydon, and Derek John Parkyn, Sanderstead, England, assignors to Rank-Bush Murphy Limited, London, England, a British company Filed Aug. 20, 1964, Ser. No. 390,942
Claims priority, application Great Britain, Aug. 23, 1963, 33,421/63
10 Claims. (Cl. 178—7.1)

Figure 1:
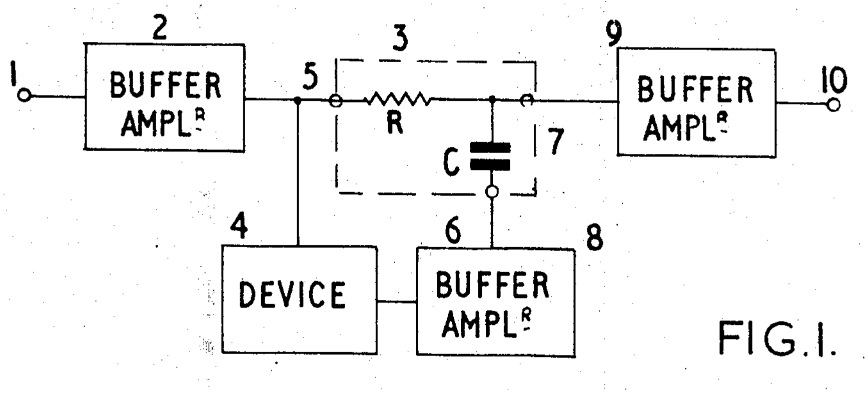

This invention relates to a video signal processor and is particularly concerned with a circuit arrangement in which a video signal is required to be subjected to the action of signal modifying circuit means in which the direct current component of the video signal is unavoidably modified, that is, altered in level, suppressed, or rendered of unacceptably poor stability. The exact nature of this device and the operation which it performs upon the signal applied to it does not concern the present invention.

It is an object of the present invention to provide a video signal processor in which a disadvantageous characteristic of known video signal processors is wholly or in part avoided.

It is a further object of the invention to provide a video signal processor providing as its output signal a modified signal having an undisturbed direct current component.

A video signal processor according to the invention in its broadest aspect comprises a first source of video signals having a correct direct current component and having a predetermined frequency range and a second source of processed video signals having said predetermined frequency range and having a direct current component which is not necessarily correct. The modifying means also comprises a combining network having first and second input ports and an output port. A first signal path within the network from the first input port to the output port has a finite transmission at zero frequency and a second signal path from the second input port to the output port has zero transmission at zero frequency. The variation with frequency of the response of the first signal path is complementary to that of the second.

Signals from the first source are applied to the first input port and signals from the second source to the second input port of the network, thus yielding at the output port a processed video signal in which the direct current component is correct.

The invention is conveniently carried out in one embodiment by applying the video signal to be processed to a three-terminal network having the configuration of a low-pass filter and also to the circuit means by which it is to be processed. The processed signal is then applied to what is normally the earthed terminal of the filter network, at the output terminal of which there then appears a processed signal with an unmodified direct current component. The application of simple network theory to such an arrangement shows that if the signals appearing at the two inputs are equal then it has the required characteristics of complementary frequency response characteristics, that for each signal path being measured with the unused input terminal earthed, while the one path has a finite response and the other a zero response at zero frequency. It will be found that a linear phase and frequency response characteristic is obtained.

Figure 2:
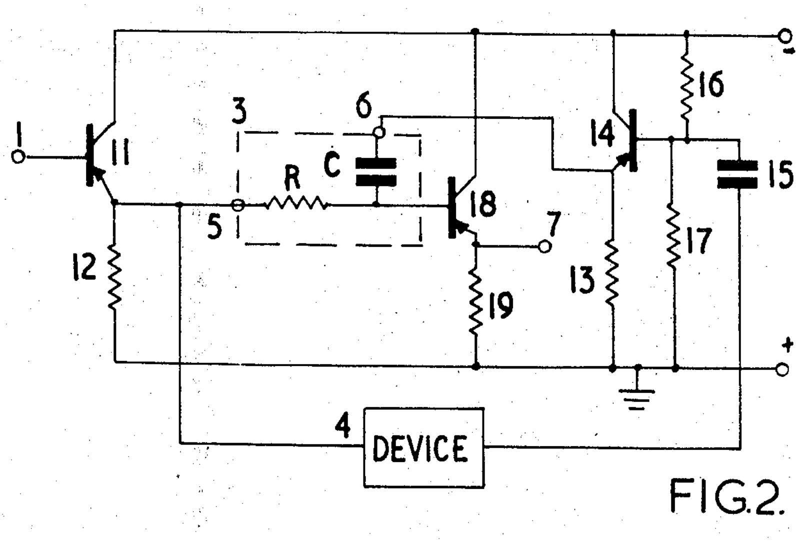
Figure 3:
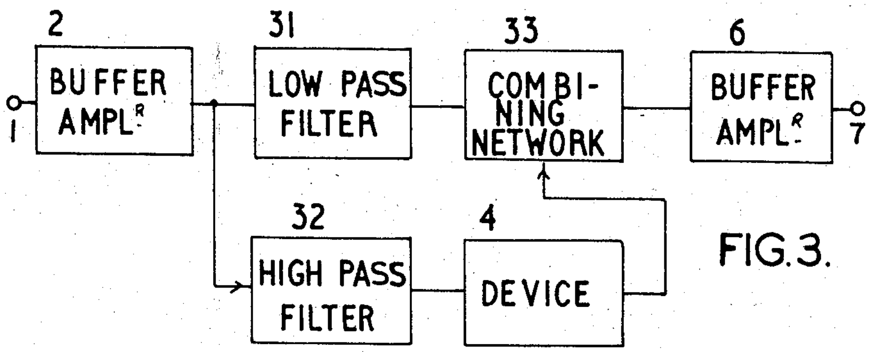
Figure 4:
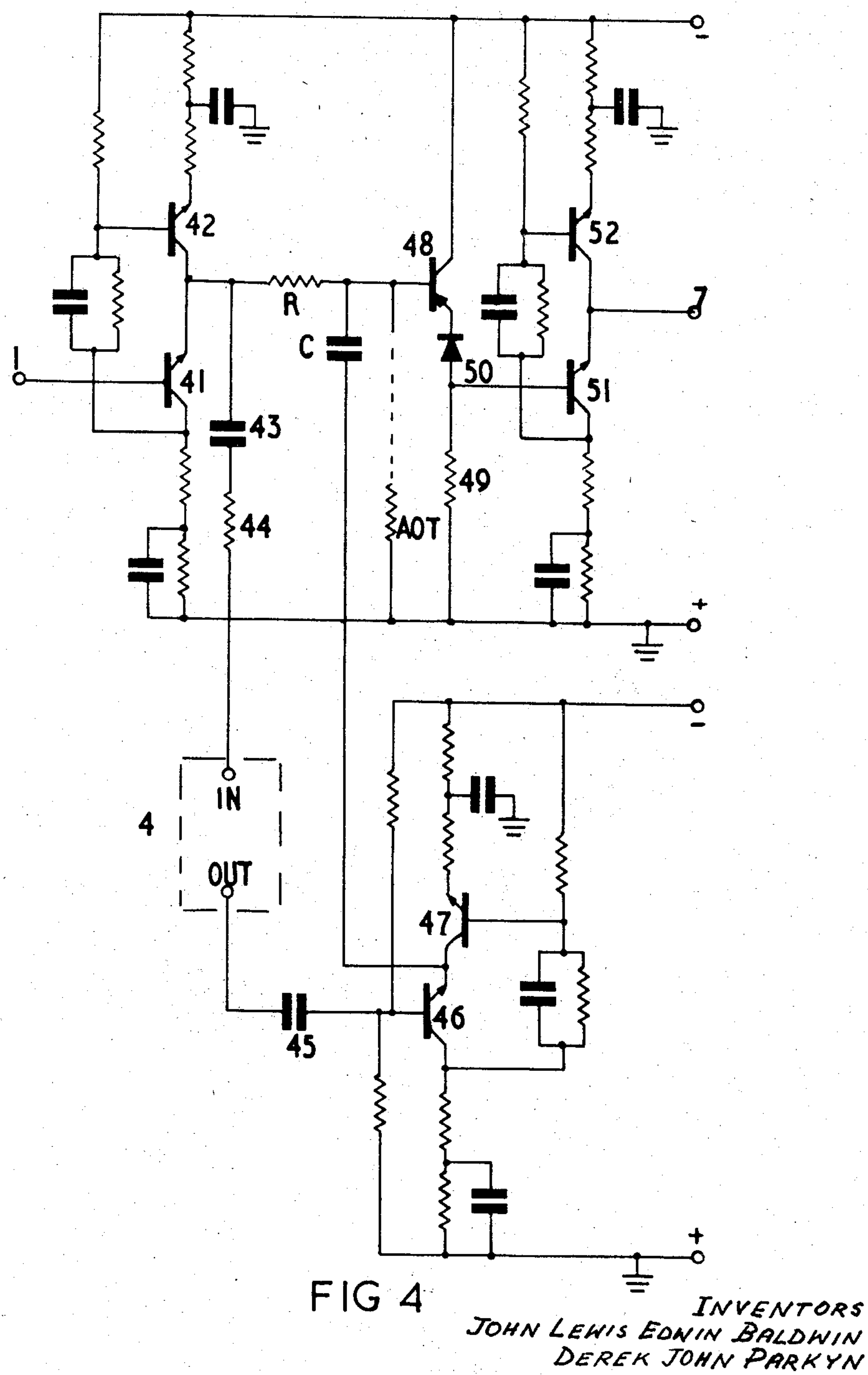

The features of the invention which are believed to be novel are set forth with particularity in the appended claims. The invention, together with further objects and advantages thereof, may best be understood by reference to the following description taken in conjunction with the accompanying drawings, in the several figures of which like elements bear like reference numerals. The drawings comprise FIGURES 1 to 4, of which:

FIGURE 1 is a block schematic diagram of an embodiment of a signal processing circuit arrangement according to the present invention, FIGURE 2 is a partly schematic diagram illustrating in more detail an embodiment of the invention, FIGURE 3 is a block schematic diagram illustrating an alternative embodiment of the invention, and FIGURE 4 is a complete circuit diagram of a circuit arrangement for carrying out the invention in one embodiment.

In the video signal processor illustrated in FIGURE 1 video signals to be processed are received at an input terminal 1 and are applied thence to a buffer amplifier 2 having a gain of unity and a very low output impedance. The output signals from buffer 2 are applied to one input terminal of a combining network indicated generally by reference 3 and also to a signal processing device 4 of which the exact nature does not concern the present invention. Device 4 is, however, assumed to have characteristics such that the direct-current component of signals passed through it is modified in an undesirable manner. In accordance with the invention the characteristics of combining network 3 are that it has two input terminals 5, 6 and a common output terminal 7. The signal path within network 3 from input terminal 5 to output terminal 7 has a finite direct-current or zero-frequency response, while that from input terminal 6 to output terminal 7 is zero. In addition the frequency-response characteristics of the two paths, measured in each case with the other input terminal earthed, are complementary. The simplest form of network having these desired characteristics is that shown, where path 5–7 comprises a resistor R and path 6–7 a capacitor C. It is, however, within the scope of the invention to employ other and more complex networks having the stated characteristics. The output signal from processing device 4 is applied to a buffer amplifier 8 of very low output impedance and thence to input terminal 6 of network 3, by way of which the signal of modified direct-current component is combined with components of the initial signal to yield a combined signal having the desired modified characteristics of the higher-frequency portions but also the desired unmodified direct-current component. The combined signal appearing at output terminal 7 of network 3 is then applied to a further buffer amplifier 9, which should preferably have a high input impedance and will usually, though not necessarily, have a gain of unity. The output signal from buffer 9 is taken for use as required by way of an output terminal 10.

If the input impedance of buffer amplifier 9 is not high it is nevertheless normally possible to compensate for it by making the amplitude of the signal at terminal 6 differ from that at terminal 5 in such a manner as to restore the correct balance of the D.C. and higher-frequency signal components.

FIGURE 2 shows the basic principles of a practical embodiment of a signal processor according to the invention. Input signals received at an input terminal 1 are applied to the base of a transistor 11, which is connected as an emitter-follower buffer amplifier, a load resistor 12 being connected in its emitter lead, while its collector is connected directly to the negative supply line. Signals appearing across resistor 12 are fed both to a filter network 3 and to a device 4 which modifies the higher-frequency components of the applied signal. The filter network 3 is composed of a series resistor R and a shunt capacitor C, the low-potential terminal of which is returned to earth by way of a resistor 13 connected in the emitter lead of a further transistor 14, to the base of which the output signals from device 4 are applied by way of an inolating capacitor 15. It will be apparent that the frequency response of the signal path from the input to device 4 to input terminal 6 of network 3 should be such that undesired distortion of the overall characteristics is avoided. The base direct potential of transistor 14 is set to a suitable value by means of resistors 16 and 17 through which the base is returned respectively to the negative and positive supply lines. The signal appearing at the junction of resistor R and capacitor C of filter network 3 is applied to the base of another transistor 18, which is again connected as an emitter-follower, having a resistor 19 in its emitter lead, signals appearing across which are applied to an output terminal 20.

Another embodiment of the invention may take the form illustrated by FIGURE 3. Here the signal received at terminal 1 is fed by way of a buffer amplifier 2 to a low-pass filter 31 and to a high-pass filter 32. These filters are designed so that together they pass the whole range of signal frequencies applied to terminal 1. The higher-frequency signal components passed by filter 32 are applied to a device 4 which modifies the direct-current component. The output signal from device 4 is applied to a combining network 33 according to the invention in which it is added to the lower-frequency and direct-current components of the signal passed by filter 31. The recombined signal is then fed through a buffer amplifier 6 to an output terminal 7 as before.

FIGURE 4 is the circuit diagram of a practical embodiment of the circuit arrangement shown in FIGURE 2. Signals received at terminal 1 are applied directly to the base of a transistor 41, which with transistor 42 forms a shunt-regulated emitter follower. The detailed operation of this circuit arrangement is presumed to be well known and will not be further described. The output signal from emitter-follower 41–42 is taken from the junction of these two transistors and applied to one input terminal of a combining network composed of a series resistor R and a shunt capacitor C. This arrangement offers a high impedance to the higher-frequency portion of the signal which is fed through an isolating capacitor 43 and a source terminating resistor 44 to the input terminal of device 4, which as before is presumed to impair the direct-current component of the signal. Output signals from device 4 are fed by way of a further isolating capacitor 45 to the base of a transistor 46, which, together with transistor 47 and the immediately associated components, forms another shunt-regulated emitter-follower, the output signals taken from the junction of the two transistors being applied to the low-potential terminal of capacitor C in the combining network. The higher- and lower-frequency portions of the signal are thus re-combined at the junction of resistor R and capacitor C, whence the complete signal is applied to the base of an emitter-follower transistor 48. Transistor 48 has a diode 50 connected between its emitter and the load resistor 49 in its emitter lead. This diode is added to ensure that equal numbers of p-n and n-p junctions are included in the signal path, thus reducing to a minimum the variation of the output D.C. level with change of temperature. It will be seen that transistors 41 and 51 introduce p-n junctions into the signal path, whereas diode 50 and transistor 48 supply n-p junctions. It is also desirable that the materials for these components be appropriately chosen; appropriate choices are as follows:

All junctions germanium
All junctions silicon
Two junctions germanium, two silicon In some circumstances it may be inconvenient to comply with any of these selections, owing to unavailability of the appropriate type of transistor or diode. It is then possible to reduce the D.C. variation from input to output substantially to zero by adding a resistor AOT between the base of transistor 48 and the positive supply line. This arrangement will somewhat reduce the overall gain of the arrangement from its nominal value of unity.

While particular embodiments of the invention have been shown and described, it is apparent that changes and modifications may be made without departing from the invention in its broader aspects. The aim of the appended claims, therefore, is to cover all such changes and modifications as fall within the true spirit and scope of the invention.

We claim:

1. A video signal processor comprising the combination of: a first source of video signals having a predetermined frequency range including zero frequency and having a correct zero-frequency component; a second source of modified video signals having said predetermined frequency range and having a direct-current component which is not said correct component; a combining network having first and second input ports and an output port; a first signal path having a predetermined variation of response with signal frequency over said predetermined frequency range including finite response at zero signal frequency within said network from said first input port to said output port; a second signal path within said network from said second input port to said output port, said second path having a variation of response with signal frequency over said predetermined frequency range which is complementary to that of said first path including zero response at zero signal frequency; circuit means applying signals from said first source to said first input port; circuit means applying signals from said second source to said second input port; and circuit means for deriving said processed video signal from said output port.

2. A signal processor in accordance with claim 1 in which said circuit means applying said signal from said first source to said first input port includes a buffer amplifier.

3. A signal processor in accordance with claim 1 in which said circuit means applying said signal from said second source to said second input port includes a buffer amplifier.

4. A signal processor in accordance with claim 1 in which said circuit means for deriving said processed signal from said output port includes a buffer amplifier.

5. A video signal processor in accordance with claim 1 in which said combining network comprises a resistor connecting a terminal of said input port to a terminal of said output port; a capacitor connecting a terminal of said second input port to said terminal of said output port; and direct connections between the remaining terminals of said three ports.

6. A video signal processor comprising, in combination: a source of video signals having a predetermined frequency range including zero frequency; a known device having input and output terminals, said device operating on an applied signal to produce a desired modification in a signal characteristic but also to produce an undesired modification in the zero frequency component thereof; circuit means applying said video signal from said source to said input terminals of said device; a combining network having first and second input ports and an output port; a first signal path having a predetermined variation of response with signal frequency, said response being finite at zero frequency, within said network from said first input port to said output port; a second signal path having a variation of response with signal frequency which is complementary to that of said first path over said predetermined frequency range, said response being zero at zero signal frequency; circuit means applying video signals from said source to said first input port; circuit means applying modified video signals from said output terminals of said device to said second input port; and means for withdrawing said processed signal from said output port.

7. A video signal processor in accordance with claim 6 in which said combining network comprises a resistor connecting a terminal of said input port to a terminal of said output port; a capacitor connecting a terminal of said second input port to said terminal of said output port;

and direct connections between the remaining terminals of said three ports.

8. A signal processor comprising, in combination: a source of video signals having a predetermined frequency range including zero frequency; a low-pass filter having input terminals and output terminals, said filter having a predetermined cutoff characteristic; a high-pass filter having input terminals and output terminals, said high-pass filter having a cutoff characteristic complementary to that of said low-pass filter; circuit means conveying signals from said source alike to said input terminals of said low-pass filter and of said high-pass filter; a combining network having first and second input terminals and output terminals, said network including a first signal path having a predetermined variation of response with signal frequency over said predetermined frequency range, including finite response at zero signal frequency from said first input terminals to said output terminals, and including also a second signal path having a variation of response with signal frequency which is complementary to that of said first path, including zero response at zero signal frequency, from said second input terminals to said output terminals; a device having input terminals and output terminals, said device operating on an applied signal to produce a desired modification in a signal characteristic but also to produce an undesired modification in the zero-frequency component thereof; circuit means conveying signals from said output terminals of said low-pass filter to said first input terminals of said combining network; circuit means conveying signals from said output terminals of said high-pass filter to said input terminals of said device; circuit means conveying signals from said output terminals of said device to said second input terminals of said network; and circuit means withdrawing said processed video signal from said output terminals of said combining network.

9. A signal processor in accordance with claim 8 in which said circuit means conveying signals from said source to said input terminals of said low-pass and said high-pass filters is constituted by a common buffer amplifier.

10. A signal processor in accordance with claim 8 in which said circuit means withdrawing said processed video signals from said output terminals of said combining network is a buffer amplifier.

References Cited

UNITED STATES PATENTS

| | | | |
|---|---|---|---|
| 3,085,131 | 4/1963 | Diehl | 178—7.1 |
| 3,333,055 | 7/1967 | Krause | 178—6 |

ROBERT L. GRIFFIN, *Primary Examiner.*

R. L. RICHARDSON, *Assistant Examiner.*